United States Patent [19]

Bench et al.

[11] Patent Number: 4,729,089
[45] Date of Patent: Mar. 1, 1988

[54] TRANSIENT SUPPRESSION FOR MICROPROCESSOR CONTROLS FOR A HEAT PUMP AIR CONDITIONING SYSTEM

[75] Inventors: Ronald W. Bench, Kirkville; Mario F. Briccetti, Clay, both of N.Y.

[73] Assignee: Carrier Corporation, Syracuse, N.Y.

[21] Appl. No.: 700,420

[22] Filed: Feb. 11, 1985

[51] Int. Cl.<sup>4</sup> ...................... G06F 15/20; G05D 23/32
[52] U.S. Cl. ........................................ 364/184; 62/158; 62/160; 165/13; 165/17; 361/110; 364/505; 371/12
[58] Field of Search ............... 364/184, 185, 186, 557, 364/505, 483, 492; 62/158, 160, 324.1; 318/438, 785, 786; 34/43–45; 371/12, 13, 62, 66; 165/11.1, 13, 14, 17; 361/110, 111

[56] References Cited

U.S. PATENT DOCUMENTS

| | | | |
|---|---|---|---|
| 3,832,534 | 8/1974 | Carlson et al. | 364/184 |
| 4,335,847 | 6/1982 | Levine | 364/505 |
| 4,481,786 | 11/1984 | Bashark | 62/160 |
| 4,586,149 | 4/1986 | Stillman et al. | 364/184 X |
| 4,631,658 | 12/1986 | Easthill | 364/184 |

Primary Examiner—Joseph Ruggiero
Attorney, Agent, or Firm—Robert H. Kelly

[57] ABSTRACT

A method of operating a switching relay with inductive coils by a microprocessor control to prevent the transient electro-magnetic noise caused by the switching relay from resetting the microprocessor and restarting the program at the beginning. Prior to switching a relay a code is loaded in the memory of the control. After the relay switching noise causes a reset, the control detects the code and jumps back to its proper place without a disruption in its operation.

3 Claims, 4 Drawing Figures

TRANSIENT SUPPRESSION FOR MICROPROCESSOR CONTROLS FOR A HEAT PUMP AIR CONDITIONING SYSTEM

BACKGROUND OF THE INVENTION

This invention relates generally to microprocessor based controls for a demand defrost heat pump control. More specifically, the present invention relates to a method and apparatus for controlling a microprocessor controlled relay for a heat pump system which has the ability to determine when the microprocessor is reset due to relay switching noise or the microprocessor has just been powered-up and the program should start its initialization routine.

Heat pumps include a refrigeration circuit with a compressor and outdoor and indoor heat exchanger coils controlled to function alternately as an evaporator and a condenser in response to a thermostat controlled reversing valve calling for refrigerant to flow in one direction during heating cycles and in the opposite direction during cooling cycles. During the cooling mode the indoor coil functions as an evaporator absorbing surplus heat from the indoor air, and the outdoor coil functions as a condenser rejecting the heat into the outdoor air. During the heating mode the outdoor heat exchanger provides means to vaporize the liquid refrigerant by heat transfer from air flowing through the heat exchanger. Efficient operation of the system requires that sufficient heat be transferred from the air flowing through the outdoor heat exchanger to maintain adequate capacity to meet the heating demand of the conditioned space. When the outdoor temperatures are around 40° F., colder moisture from the outdoor air is collected on the outdoor coil fins in the form of frost. The frost blocks air flow through the heat exchanger thereby reducing the heat exchanger's capacity for heat transfer below that required to meet the heating demand in the conditioned space. It is therefore common practice to defrost the outdoor heat exchanger, melting the accumulated frost to prevent an unacceptable level of heat transfer degradation.

The frost accumulation is removed by temporarily operating the heat pump in a cooling cycle, wherein hot refrigerant vapor from the indoor coil is pumped through the compressor to the outdoor coil to heat it for frost removal. The defrost cycle is periodically implemented by numerous techniques known in the art. Generally, all defrost controls incorporate relays to switch off the outdoor fan when entering a defrost cycle, to switch on the reversing valve solenoid when entering the defrost cycle, and to switch on strip heater sequencers when entering the defrost cycle. However, in a microprocessor control, transient electro-magnetic noise can cause an unwanted failure in the control. This problem is especially troublesome when the control, by switching relays with inductive coils, causes the microprocessor to reset, i.e. the processor program stops and restarts at its beginning, generally causing a discontinuous control operation.

SUMMARY OF THE INVENTION

It is an object of the present invention to provide a more reliable control system by preventing unwanted failures.

It is another object of the present invention to provide a control system that prevents transient electromagnetic noise due to switching relays with inductive coils from resetting the control to its starting point.

These and other objects are attained in accordance with the present invention as it applies to a heat pump utilizing an indoor coil and an outdoor coil wherein there is provided a hot gas defrost system utilizing superheated gas from the system compressor outlet which is conducted directly into the heat exchanger to be defrosted. During defrost, and other control functions involving switching relays with inductive coils, the microprocessor loads its memory with a specific code and after a relay switching noise causes a reset, the control detects the specific code and continues its present operation without resetting and restarting at the beginning.

The various features of novelty which characterize the invention are pointed out with particularity in the claims annexed to and forming a part of this specification. For a better understanding of the invention, its operating advantages, and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawing designate like or corresponding parts throughout the same.

DESCRIPTION OF THE PREFERRED EMBODIMENT

Figure 1:
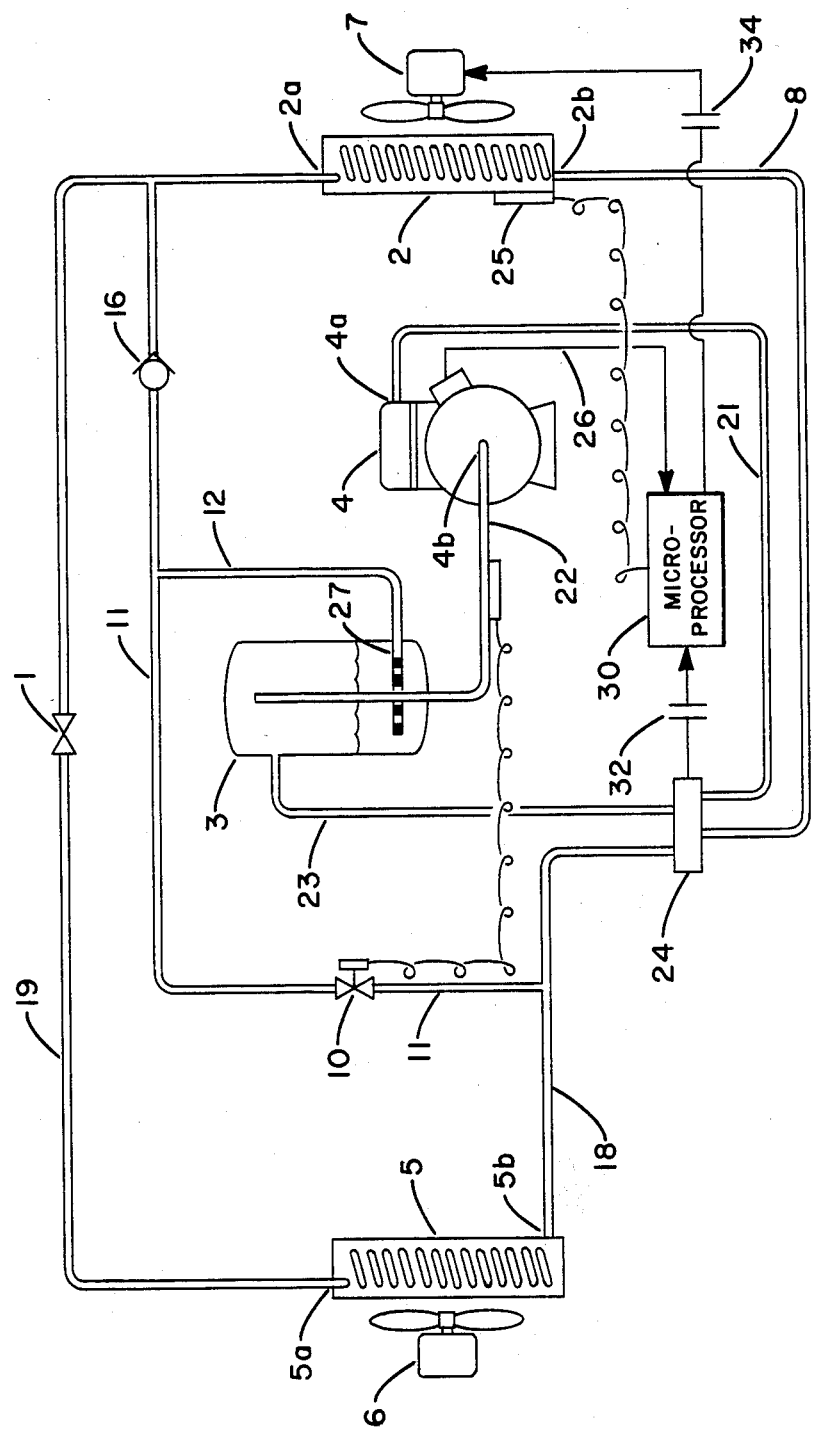
FIG. 1 is a schematic view of a heat pump circuit incorporating the claimed invention.

Referring now to FIG. 1 there is shown a heat pump system in which an expansion valve 1, an outdoor coil 2, an accumulator 3, a compressor 4, an indoor coil 5, and a reversing valve 24 are connected in a closed fluidic circuit for effecting the transfer of heat between the outdoor coil and the indoor coil. The compressor 4 has an outlet 4b in fluid communication with an inlet 5b of the indoor coil 5 through reversing valve 24 for discharging superheated gaseous refrigerant thereinto for effecting heating of an enclosure during operation of the refrigeration system.

In the heating mode of operation as the heat exchange fluid is passed from compressor 4 through conduit 21 to reversing valve 24, through line 18 and through the indoor coil 5, a fan 6 is energized to direct a stream of air through the coil effecting heat transfer between the heat exchange fluid and the enclosure whereby the gaseous refrigerant is condensed to a liquid. An outlet 5a of the indoor coil 5 is coupled by conduit 19 to the expansion valve 1 through which the refrigerant passes and enters inlet 2a of the outdoor coil 2. A second fan 7 is energized to effect heat transfer between outdoor air and the heat exchange fluid passing through the coil 2 such that the liquid refrigerant is vaporized to a gaseous refrigerant. After heat transfer has been effected through the outdoor coil 2, the heat exchange fluid passes from an outdoor coil outlet 2b through a discharge conduit 8, reversing valve 24, and conduit 23 into the accumulator 3. The gaseous refrigerant is then passed from the accumulator through conduit 22 to inlet 4a of the compressor 4 to repeat the cycle as is known to those skilled in the art. In the cooling mode of operation the reversing valve acts to reverse the flow of refrigerant such that the outdoor coil becomes the condenser and the indoor coil becomes the evaporator.

After the heat pump system has been in operation in the heating mode, frost or ice may form on the outdoor coil 2. The amount of frost and rate of accumulation are dependent upon the ambient environmental conditions. When ice accumulates on the outdoor coil 2, the heat transfer efficiency of the refrigeration system decreases and, therefore, the accumulation of ice must be removed to maintain efficiency within the system. Upon the accumulation of a sufficient amount of ice on the outdoor coil 2, the ice is melted from the coil by circulating hot refrigerant through the coil. While detection of this predetermined amount of ice accumulation to determine an initiation point for the defrost cycle does not form a part of the present invention, such defrost cycle may be initiated periodically by means of a timer, or other suitable system for the detection of an amount of ice on the coil.

When the defrost cycle has been initiated and the unit is in the heating mode of operation, a by-pass valve 10 in conduit 11 is opened providing fluid communication between the discharge outlet 4b of compressor 4 and the parallel coupled inlet 2a of the outdoor coil 2 and by-pass conduit 12 which is connected to accumulator 3. Upon opening of the by-pass valve 10, superheated discharge gas from the outlet 4b of the compressor 4 passes through reversing valve 24, conduit 18 and conduit 11 into the by-pass conduit 12 and the inlet 2a of the outdoor coil 2. A portion of the superheated discharge gas passes into outdoor coil 2 wherein the refrigerant absorbs heat from the coil to melt the ice thereon. A portion of the superheated discharge gas passes directly into accumulator 3 through by-pass conduit 12. The gas conducted through the outdoor coil 2 loses its superheat plus latent energy to the ice thereby melting the accumulation of ice formed on outdoor coil 2 and a portion of said gas being condensed to a liquid. Check valve 16 in conduit 11 serves to maintain refrigerant flow in the proper direction through the conduits during system operation and defrost operation.

During defrost some of the refrigerant is condensed in outdoor coil 2. The liquid refrigerant from the outdoor coil then passes through conduit 8 and the reversing valve to accumulator 3. The other portion of the superheated discharge gas passing through by-pass conduit 12, is discharged into the liquid refrigerant contained in accumulator 3 through bubbler pipe 27 thereby vaporizing a portion of the liquid refrigerant contained therein. The direct discharge of superheated discharge gas into the accumulator 3 supplies a sufficient amount of gaseous refrigerant to inlet 4a of compressor 4, in combination with vaporizing the accumulated liquid refrigerant contained in the accumulator through the loss of the superheat energy of the discharge gas to maintain the saturated suction temperature of the refrigeration system above the melting temperature of the ice.

Figure 2:
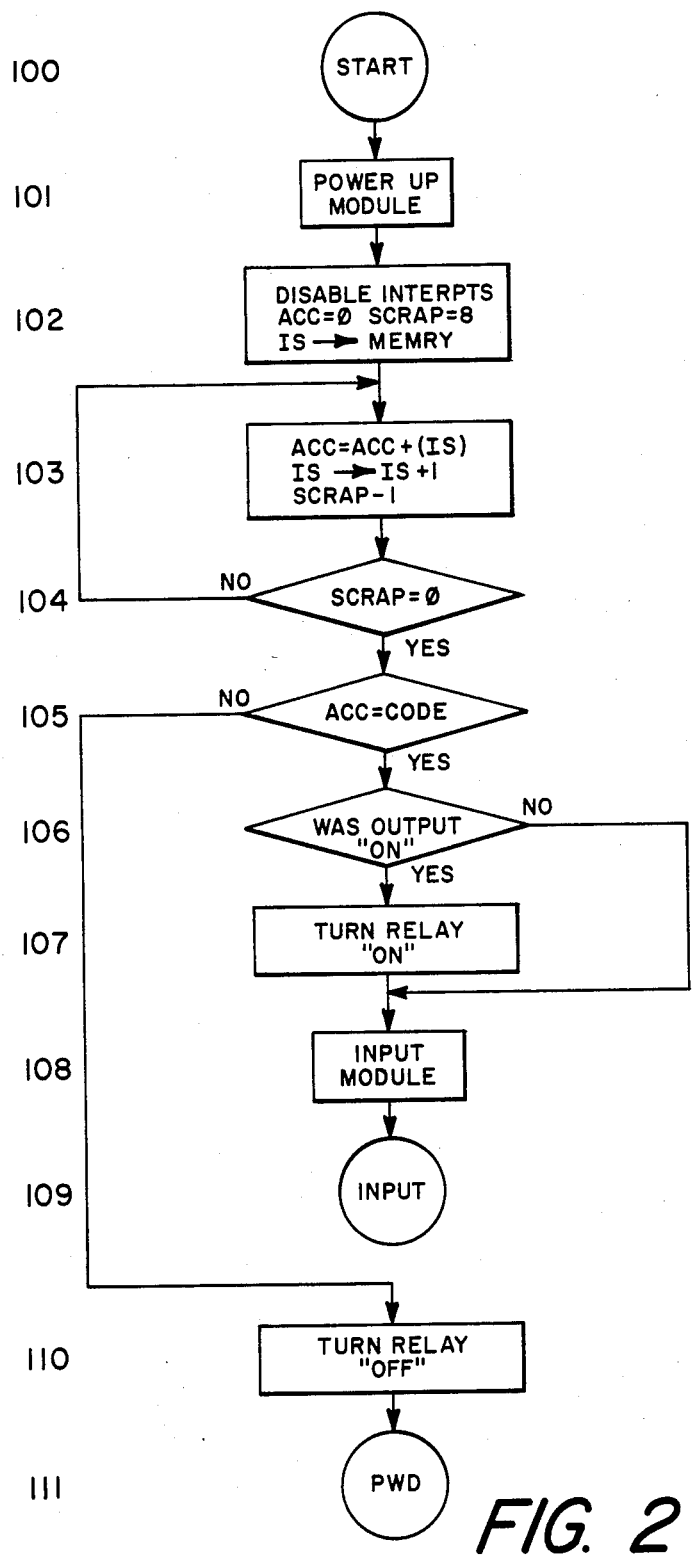
FIG. 2 is a flow diagram of a summary of a microprocessor control for the heat pump system.

FIG. 2 is a flow chart indicating the initial operation of the control system. It can be seen that the overall system control is obtained by logic flow through a series of logic steps. Each logic step may represent a subroutine or series of steps omitted for clarity in this overall chart. In this flow chart, diamond shaped boxes represent program inquiries that lead to program instructions shown in rectangular boxes, while circles and oblongs represent instructions to go to other points or subroutines in the program. The initial step 100 is the start of the unit upon receiving steady state power. Thereafter at step 101 the powerup module initializes system variables, thus allowing the control to operate at steady state. Step 102 sets a data pointer so that steps 103, 104 and 105 can determine whether a code has been entered into an address. At steps 103 and 104 the test code is read so that step 105 can determine if a code is present or if the computer has just been powered up. At step 105, if the code is present then the computer has been powered up and any reset would be caused by transient noise and the logic proceeds to step 106. At step 106 there is a determination whether the relay had been previously on or off. If the relay had been on then the logic proceeds to step 107 to ensure that the relay is still on. If it is determined in step 106 that the relay was not previously on, then the logic jumps to step 108, the input module. If in step 105 there is no code in the memory then the logic jumps to step 110 and the output relay shall be off.

Figure 3:
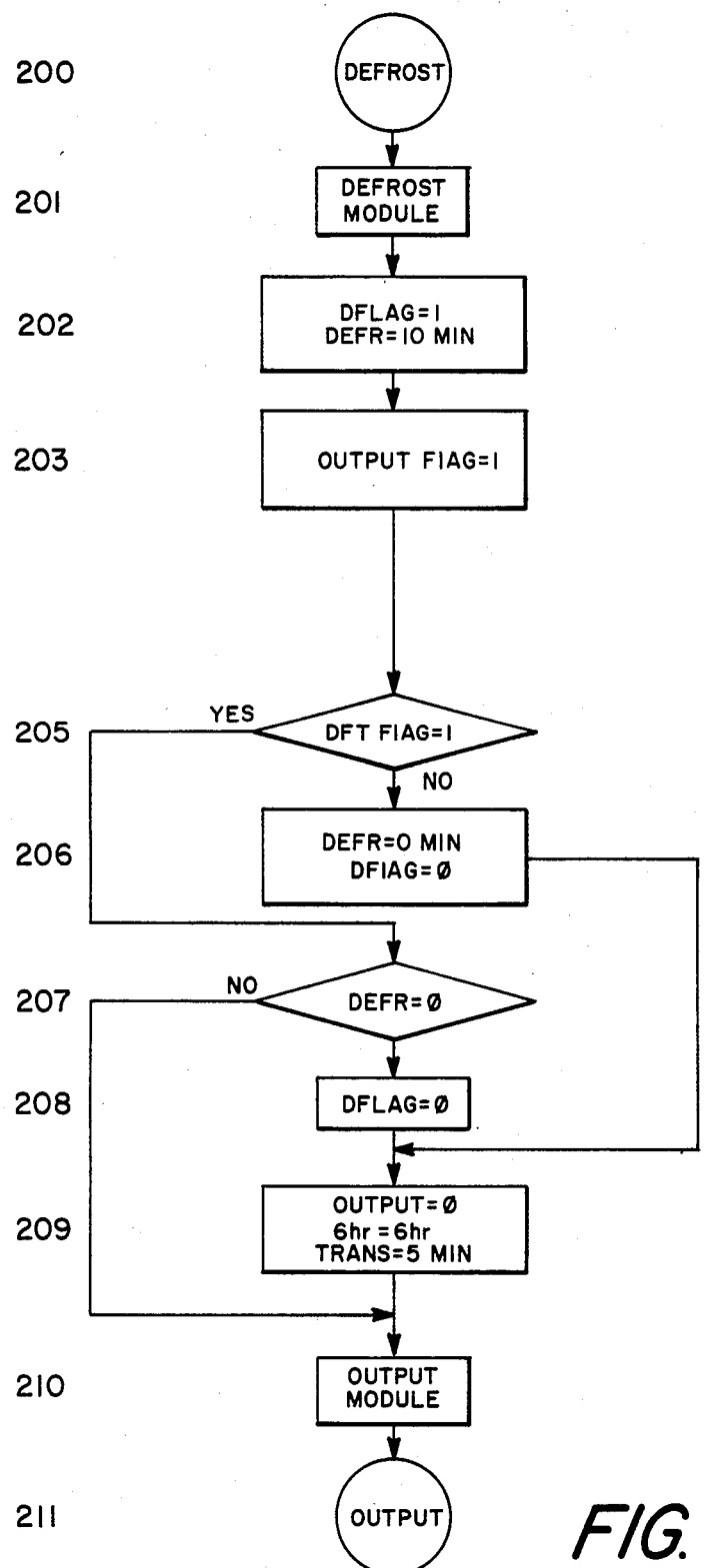
FIG. 3 is a flow diagram of the defrost control function accomplished by the microprocessor.

Referring to FIG. 3 there may be seen a flow chart for a specific subroutine to control operation of the defrost of the outdoor coil of the heat pump. Defrost mode 200 is that state when the heat pump is removing accumulated frost from the outdoor coil 2. The function of the defrost module 201 is to maintain control of specific timers and to set particular output relays when entering or leaving defrost. When the control is in the defrost module the relay controlled by input 109 should be turned on. From step 201 the logic flows to step 202 where a determination is made that the system should be in defrost and a ten minute timer is set to ten minutes. The defrost module should be terminated after ten minutes of compressor run time. Thereafter, at step 203 it is determined to turn the output relay on. Once in the defrost mode step 205 acts to check the thermistor 25 on the outdoor coil to see if the coil is defrosted. If the thermistor is open then defrost is complete and the logic proceeds to step 206. Step 206 updates the compressor current and proceeds to turn the output relay off. If in step 205 the defrost thermistor is closed, indicting defrost is not complete, the logic jumps to step 207. Step 207 determines if a ten minute cycle is complete. If a ten minute cycle has been completed the logic goes to step 208. If a ten minute cycle is not complete the logic skips to step 210. If a ten minute cycle is complete in step 207 the logic moves to step 208 and determines that the relay should be turned off. The logic then proceeds to step 209 where a six hour timer is set for initiation of the next defrost cycle, a five minute delay is initiated for reading compressor current and the output relay should be open or in the off position. The logic then proceeds to step 210 and 211 and the output relay shall be turned off.

Figure 4:
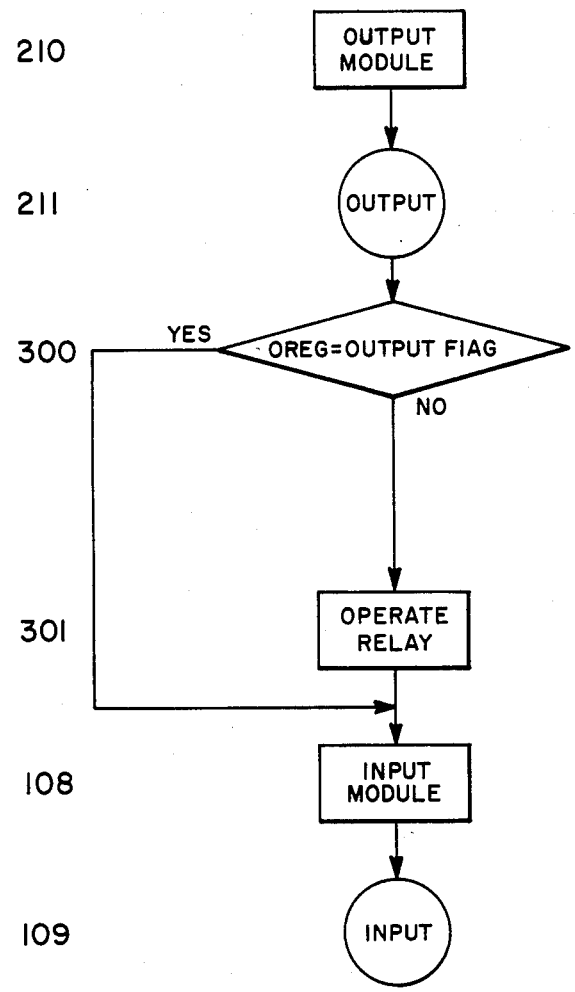
FIG. 4 is a flow diagram of the transient suppression control for the microprocessor.

Referring now to FIG. 4 there may be seen a flow chart indicating the noise effect of the transient when the relay changes state. At step 300 the logic determines whether the present condition of the relay is the condition in which the relay should be. In other words, at step 300 it is determined whether or not the relay should change state. If the answer to the logic of step 300 is yes the logic proceeds to step 108 and the relay maintains its present position. If the answer to the logic in step 300 is no the logic proceeds to step 301 and it is determined to operate the relay.

It is the operation of the relay, whether opening or closing the contacts, which causes the unwanted electromagnetic noise. It is this noise that causes a possible reset transient. Accordingly, after a relay switching noise causes a reset, the logic returns to step 100 and determines whether or not a code was entered in step 105. As described above, if there is no code in step 105 the logic skips to step 110 to turn the relay off. If however a code is in step 105 the logic proceeds to step 106 to determine the condition of the relay just prior to the noise. In other words, if defrost had just been terminated and the output relay turned off, which caused an unwanted noise and reset, step 106 would proceed to step 108 and maintain the output relay off.

It can be seen that this control method is especially useful when the control switches a relay causing a possible reset transient. After the relay switching noise causes a reset, the control detects a code and jumps back to its place without a disruption in its operation. No disruption in the operation is accomplished, since the electronic switching of the microprocessor operates many times faster than the time required for the actual movement of the contacts of the relay.

The invention has been described herein with reference to a particular embodiment. It is to be understood by those skilled in the art that variations and modifications can be effected hereto within the spirit and scope of this invention.

What is claimed is:

1. A method for controlling the operation of a heat pump having a microprocessor control, to prevent resetting the heat pump controls to their startup condition due to transient electromagnetic noise of a switching relay which comprises the steps of:

starting power-up of the microprocessor with a program for controlling the switching relay;
   loading a code into memory of the microprocessor affirming the power-up is complete;
   running said program whereby the switching relay is switched whereby noise is generated and whereby said program stops and jumps to the starting power-up condition; and
   reading said code affirming the power-up was complete and having the program bypass the power-up and jump to a position at which the program was immediately before the noise causing reset.

2. A method of controlling the operation of a heat pump having a microprocessor control as set forth in claim 1 wherein the step of running said program whereby the switching relay is switched comprises running a program for defrost operation to switch a defrost relay.

3. A method of operating a microprocessor control having a programmed procedure for the switching of a relay with an inductive coil comprising the steps of:

initializing a microprocessor program when the program is first energized to a start position;
   storing in a memory of the microprocessor a code prior to switching the relay affirming the microprocessor has been initialized;
   switching the relay whereby electromagnetic noise causes the microprocessor program to reset to a position when the microprocessor was first energized; and
   detecting the stored code and returning the microprocessor control back to the position before the relay was switched, without disruption in the operation of the microprocessor program and without running through said initializing step.

* * * * *